US005358676A

United States Patent [19]
Jennings et al.

[11] Patent Number: 5,358,676
[45] Date of Patent: Oct. 25, 1994

[54] METHODS OF MANUFACTURE AND USE FOR HYDRAULICALLY BONDED CEMENT

[75] Inventors: Hamlin M. Jennings, Evanston, Ill.; Per J. Andersen; Simon K. Hodson, both of Santa Barbara, Calif.

[73] Assignee: E. Khashoggi Industries, Santa Barbara, Calif.

[21] Appl. No.: 981,615

[22] Filed: Nov. 25, 1992

Related U.S. Application Data

[63] Continuation-in-part of Ser. No. 856,257, Mar. 25, 1992, abandoned, which is a continuation of Ser. No. 526,231, May 18, 1990, abandoned.

[51] Int. Cl.$^5$ ............... B28B 1/08; B28B 1/26; B28B 3/00; C04B 40/02
[52] U.S. Cl. .................... 264/71; 264/28; 264/82; 264/85; 264/86; 264/87; 264/102; 264/104; 264/122; 264/128; 264/234; 264/237; 264/333; 264/336; 264/345; 264/348; 264/DIG. 43
[58] Field of Search ............ 264/333, 69-72, 264/42, 28, 256, 82, 85, 109, 128, 86, 87, 101, 102, 301-302, 240, 31, DIG. 43, 44, 49, 344, 345, 234, 237, 348, 336, 104, 122

[56] References Cited

U.S. PATENT DOCUMENTS

| 591,168 | 10/1897 | Heinzerling . | |
|---|---|---|---|
| 1,427,103 | 8/1922 | Haenicke | 264/123 |
| 3,468,993 | 9/1969 | Bierlich | 264/82 |
| 3,526,172 | 10/1970 | Stuart | 94/25 |
| 3,683,760 | 8/1972 | Silva | 264/333 X |
| 3,770,859 | 11/1973 | Bevan | 264/333 X |
| 3,914,359 | 10/1975 | Bevan | 264/333 X |
| 3,917,781 | 11/1975 | Gabriel et al. | 264/333 X |
| 3,927,163 | 12/1975 | Gabriel et al. | 264/333 X |
| 3,950,470 | 4/1976 | Davidovits | 264/113 |
| 3,983,050 | 9/1976 | Mecham | 252/301.1 |
| 3,985,925 | 10/1976 | Lefebvre et al. | 428/92 |
| 4,000,027 | 12/1976 | Dalle et al. | 156/73.6 |
| 4,028,454 | 6/1977 | Davidovits et al. | 264/82 |
| 4,117,059 | 9/1978 | Murray | 264/333 X |
| 4,193,958 | 3/1980 | Uchida et al. | 264/333 X |
| 4,196,161 | 4/1980 | Toffolon et al. | 264/333 X |
| 4,233,368 | 11/1980 | Baehr et al. | 264/333 X |
| 4,239,716 | 12/1980 | Ishida et al. | 264/333 X |
| 4,244,904 | 1/1981 | Drain | 264/333 X |
| 4,328,178 | 5/1982 | Kossatz | 264/256 X |
| 4,349,386 | 9/1982 | Davidovits | 106/85 |
| 4,407,769 | 10/1983 | Harada et al. | 264/333 X |
| 4,427,610 | 1/1984 | Murray | 264/333 X |
| 4,472,199 | 9/1984 | Davidovits | 106/85 |
| 4,509,985 | 4/1985 | Davidovits et al. | 106/84 |
| 4,522,652 | 6/1985 | Neuschäffer et al. | 106/84 |
| 4,522,772 | 6/1985 | Bevan | 264/333 X |

(List continued on next page.)

FOREIGN PATENT DOCUMENTS 0030408 6/1981 European Pat. Off. .

(List continued on next page.)

OTHER PUBLICATIONS

J. M. Bukowski et al., "Reactivity and Strength Development of $CO_2$ Activated Non-Hydraulic Calcium Silicates", *Cement and Concrete Research*, vol. 9, pp. 57–68, 1979.

(List continued on next page.)

*Primary Examiner*—Karen Aftergut
*Attorney, Agent, or Firm*—Workman, Nydegger & Jensen

[57] ABSTRACT

The present invention relates to hydraulically bonded cement compositions and methods of manufacture. Hydraulically bonded cement compositions and methods of manufacture include materials prepared by manipulating under pressure powdered hydraulic cement compositions using known or novel powder packing, casting, or expanding techniques, such that air within the powdered hydraulic cement is successfully removed while the cement is formed into a self-supporting near net final position. Thereafter, the formed hydraulic cement article is hydrated without mechanical mixing of the cement and water.

125 Claims, No Drawings

U.S. PATENT DOCUMENTS

| | | | |
|---|---|---|---|
| 4,524,039 | 6/1985 | Bevan | 264/333 X |
| 4,533,393 | 8/1985 | Neuschäffer et al. | 106/18.12 |
| 4,608,795 | 9/1986 | Neuschäffer et al. | 52/309.12 |
| 4,637,860 | 1/1987 | Harper et al. | 264/333 X |
| 4,640,715 | 2/1987 | Heitzmann et al. | 106/85 |
| 4,642,137 | 2/1987 | Heitzmann et al. | 106/85 |
| 4,681,631 | 7/1987 | Engles et al. | 106/4 |
| 4,772,439 | 9/1988 | Trevino-Gonzalez | 264/333 X |
| 4,812,273 | 3/1989 | Bevan | 264/333 X |
| 4,830,669 | 5/1989 | Suzuki | 106/805 |
| 4,859,367 | 8/1989 | Davidovits | 252/628 |
| 4,888,311 | 12/1989 | Davidovits et al. | 501/95 |
| 4,965,027 | 10/1990 | Takahashi | 264/56 X |
| 5,089,198 | 2/1992 | Leach | 264/333 X |

FOREIGN PATENT DOCUMENTS

| | | | |
|---|---|---|---|
| 0098813 | 1/1984 | European Pat. Off. | |
| 0437324 | 7/1991 | European Pat. Off. | |
| 3512515 | 10/1986 | Fed. Rep. of Germany | |
| 1511233 | 1/1968 | France | |
| 26523 | 2/1977 | Japan | 264/265 |
| 85/00587 | 2/1985 | PCT Int'l Appl. | |
| 00884 | 2/1986 | PCT Int'l Appl. | 264/333 |
| 89/08170 | 9/1989 | PCT Int'l Appl. | |
| 92/02344 | 2/1992 | PCT Int'l Appl. | |
| 241273 | 8/1969 | U.S.S.R. | 264/333 |
| 592599 | 2/1978 | U.S.S.R. | 264/333 |
| 960147 | 9/1982 | U.S.S.R. | 269/69 |
| 181745 | 6/1922 | United Kingdom | |
| 366544 | 2/1932 | United Kingdom | |
| 431484 | 7/1935 | United Kingdom | |
| 453555 | 9/1936 | United Kingdom | |
| 1311662 | 3/1973 | United Kingdom | 264/333 |
| 2106886 | 4/1983 | United Kingdom | |
| 2183200 | 6/1987 | United Kingdom | 264/333 |

OTHER PUBLICATIONS

R. F. Feldman, et al., "A Study of Length Changes of Compacts of Portland Cement on Exposure to $H_2O$," Paper Sponsored by Committee on Basic Research Pertaining to Portland Cement and Concrete, pp. 106–118.

Jan Hlavac, "The Technology of Glass and Ceramics–An Introduction", *Glass Science and Technology*, 4, 1983.

J. T. Jones et al., "Ceramics Industrial Processing and Testing", *The Iowa State University Press*, pp. 20–61, 1972.

Kato, et al., Glazed Panels for Exterior Building Materials, 6001 Chemical Abstracts, vol. 109: 196176y.

C. D. Lawrence, "The Properties of Cement Paste Compacted Under High Pressure", *London, Cement and Concrete Association*, Research Report 19, p. 21, Jun. 1969.

J. Norman Maycock et al., "Carbonation of Hydrated Calcium Silicates", *Cement and Concrete Research*, vol. 4, pp. 69–76, 1974.

Report on the Panel on Solids Processing, Chapter 2, pp. 18–43.

J. Skalny et al., "Low Water to Cement Ratio Concretes", *Cement and Concrete Reseach*, vol. 3, pp. 29–40, 1973.

Suzuki, et al., Manufacture of Spherical Cement, 6001 Chemical Abstracts, vol. 115: 34401q.

Katzutaka Suzuki et al., "Formation and Carbonation of C–S–H In Water", *Cement and Concrete Research*, vol. 15, pp. 213–224, 1985.

Tay, J., Reclamation of Wastewater and Sludge for Concrete Making, 2436 Resources, Conservation and Recycling, 2 (1989) Jul., No. 3, pp. 211–227.

METHODS OF MANUFACTURE AND USE FOR HYDRAULICALLY BONDED CEMENT

BACKGROUND

1. The Field of the Invention

The present invention relates to novel hydraulically bonded cement compositions and methods. More particularly, the present invention is directed to novel compositions and methods of forming and hydrating hydraulic cement articles without mechanical mixing of the cement and water. The present invention includes materials prepared by manipulating under pressure powdered hydraulic cement such that air within the powdered hydraulic cement is substantially removed while the powdered hydraulic cement is formed into a mechanically self-supporting structure of a near net final position substantially corresponding to the desired article shape. Thereafter, the formed powdered hydraulic cement is hydrated without mechanical mixing of the cement and water.

2. Related Applications

This application is a Continuation-in-part of the earlier filed application entitled HYDRAULICALLY BONDED CEMENT COMPOSITIONS AND THEIR METHODS OF MANUFACTURE AND USE, Hamlin M. Jennings, Ph.D. and Simon K. Hodson, Inventors, Ser. No. 07/856,257, filed Mar. 25, 1992 (now abandoned), which is a file wrapper continuation of the application entitled HYDRAULICALLY BONDED CEMENT COMPOSITIONS AND THEIR METHODS OF MANUFACTURE AND USE, Hamlin M. Jennings, Ph.D. and Simon K. Hodson, Inventors, Ser. No. 07/526,231, filed May 18, 1990 (now abandoned).

TECHNOLOGY REVIEW

Hydraulic cements have been used for thousands of years as the binding agent in mortars and concretes. These cement-based materials are formed by mixing hydraulic cement, which is a dry powder, with water and often, either simultaneously or subsequently, some sort of aggregate is blended into the mixture. When water is added to hydraulic cements, the existing minerals in the cement either decompose or combine with water, and a new phase, such as a calcium-silicate-hydrate structure, grows throughout the volume. Upon curing, the water-cement mixture, sometimes referred to as cement paste, binds aggregates together to form concrete and mortar. The amount of water mixed with the cement and the intensity of mixing are often carefully controlled to maximize the ultimate properties while at the same time imparting desirable rheological properties to the cement paste.

By its nature, cement has historically been mixed with water and then shaped, formed, or placed in a mold. It has long been known that higher strengths can be achieved by reducing the water to solids ratio, but this has always had the disadvantage of making the mixture more stiff and difficult to place into a mold. Thus, the practical use of cement-based materials represents a compromise between having a workable fluid mixture, which requires excess water between cement particles, and having a very strong product, which requires dense packing of the cement particles. It is a compromise between two opposing requirements: that the cement paste be fluid and that the final product be dense and strong.

The required use of a mold also placed a limiting factor on those producing cement articles. Under the traditional process, a mold was required for each cement article made. Accordingly, a producer who had few molds was limited in production output as he would have to wait for one article to cure and be removed before the next could be made. In turn, the number of molds purchased was limited to available funds and storage space.

Most of the advances in cement science over the last ten years have been dedicated to overcoming the compromise between rheological properties and strength and density properties of cements. Efforts have been made to prepare a cement paste that is fluid enough to be handled, but that will react and form a dense final product. A number of surfactants, lubricants, and mixing techniques have been proposed to enable the cement paste to be manipulated early on and then later form a strong material.

The compromise between having favorable rheological properties verses having desirable final strength and density characteristics also exist in the preparation of cement composites. As used herein, a composite material consists of a continuous matrix phase in which a second phase material is dispersed. Composites are commonly classified based upon the types of material used for the matrix such as polymers, metals, cements, and ceramics.

Attempts have been made to alter cement's characteristics by adding a second phase material such as special aggregates, fibers, or fillers. A significant problem in these prior art attempts is that the noncementitious aggregates are subjected to a hostile and often destructive environment during the mixing process. For example, the shearing forces associated with mixing the cement, water, and aggregate are capable of destroying many useful aggregates. In other cases where aggregate orientation is important, the intense mixing makes it difficult to orient fibers or metal aggregates due to the intense mixing that is required. For instance, fibers having anchors on the fiber ends tend to ball up during mixing such that they do not become sufficiently homogeneously distributed to carry the intended load.

A few attempts have also been made to subvert the rheology and mold problems by endeavoring to first compress powdered hydraulic cement into its desired form before hydrating. Such attempts, however, failed to make an article which was strong enough to be removed from the mold prior to hydration or, if it could be removed from the mold, the item was still so weak that it could only be hydrated in limited manners.

A significant problem encountered with the pressing process was that as the powdered hydraulic cement was compressed, air within the cement was also compressed. However, once the pressure was released, the air would again expand so as to create voids or cracks within the cement article, thus, disrupting the integrity of the structure of the cured article.

From the foregoing, it will be appreciated that what is needed in the art are novel compositions and methods of hydrating hydraulic cement in which the cement can be readily manipulated, shaped, and formed into a strong dense material.

Additionally, it would be a significant advancement in the art to provide novel compositions and methods of hydrating hydraulic cement in which the cement can be readily manipulated, shaped, and formed without first mechanically mixing the cement with water to form a cement paste.

It would be a further advancement in the art to provide novel hydraulic cement composite compositions and methods which do not subject the aggregates, fibers, and fillers to hostile or destructive forces.

It would be yet another important advancement in the art to provide novel hydraulic cement composite compositions and methods in which the cement matrix and the aggregates, including fibers, fillers, and powders, are deliberately positioned in a near net final configuration before hydrating the cement.

It would be still a further improvement in the art to provide novel hydraulic cement compositions and methods in which the cement and the aggregates are positioned into an article which is mechanically self-supporting in the absence of a mold.

Another advancement in the art would be to provide novel cement compositions and methods for forming mechanically self-supporting cement composition articles which are sufficiently strong to be subsequently hydrated in a plurality of ways.

It would also be an improvement in the art to provide novel compositions and methods for manipulating, shaping and forming powdered hydraulic cement under pressure such that air within the powdered hydraulic cement is substantially removed.

Finally, it would also be an improvement in the art to provide compositions and methods for selecting and positioning cement and aggregate particles such that the volume of air voids in the cement matrix is minimized.

Such hydraulic cement compositions and methods are disclosed and claimed herein.

BRIEF SUMMARY AND OBJECTS OF THE INVENTION

The present invention is directed to novel hydraulically bonded cement compositions and methods. More particularly, the present invention is directed to the preparation of novel cementitious compositions by manipulating and positioning under pressure powdered hydraulic cement such that air within the powdered hydraulic cement is substantially removed while the cement is formed into a mechanically self-supporting near net final position before hydrating the cement with water.

Importantly, the cement compositions within the scope of the present invention are hydrated without mechanical mixing of the cement and water. Once the powdered hydraulic cement is manipulated into its near net final position, there is no further mechanical mixing of the cement even when water is added for hydration. As used herein, the term "mechanical mixing" refers to the movement under the influence of mechanical energy of at least two distinct materials including solid unreacted cement particles, such that the cement particles move relative to one another a distance greater than diameter of the largest cement particles.

There are a couple of different processing techniques capable of deliberately positioning under pressure the powdered hydraulic cement particles into a self-supporting structure prior to hydration. The cement processing techniques suitable for use within the scope of the present invention include modified and adapted solids processing techniques, such as pressure compaction processes and vibratory packing processes.

There are also several different processing techniques for substantially removing the air from the powdered hydraulic cement while the cement is positioned under pressure into a mechanically self-supporting structure. These techniques include performing the solid processing in a vacuum chamber such that the air is removed from the powdered hydraulic cement and its surroundings before the cement is positioned. Porous dies can also be used to position the cement such that the air is permitted to escape during the positioning process. Finally, the theory of particle packing can be incorporated into design mixtures of the cement such that the amount of air within the cement before positioning is minimized. Particle packing comprises the selection of sizes and quantities of particles in a polynary cement mixture such that the space between the particles is minimized, thus, minimizing the amount of air within the cement matrix. Particle packing is often used in conjunction with the other techniques.

It is within the scope of the present invention to include aggregates commonly used in the cement industry with the powdered hydraulic cement prior to hydration. For many uses it is preferable to include a plurality of differently sized aggregates capable of filling interstices between the aggregates and the powdered hydraulic cement so that greater density can be achieved. Other aggregates, including unique fillers, fibers, powders, and strengtheners, may also be mixed with the powdered hydraulic cement prior to hydration.

An important advantage of positioning the powdered hydraulic cement into a desired configuration prior to hydration is that aggregates may be placed within the cement article without subjecting the aggregates to hostile and damaging mixing forces usually associated with forming a cement paste. In fact, it is possible to prepare custom designed composite materials having a cement matrix.

According to the present invention, after the powdered hydraulic cement has been deliberately positioned into a predetermined configuration, the cement is hydrated. Hydration is accomplished without mechanical mixing of the cement and water. Thus, diffusion of water (both gaseous and/or liquid) into the preconfigured cement article and immersion of the preconfigured cement article into an aqueous solution are important hydration techniques within the scope of the present invention. Those hydration parameters and conditions known in the cement industry, such as temperature, water to solids ratio, cement to aggregate ratio, particle size distribution of the cement paste, and composition of the cement paste, are also important in hydrating the cement compositions within the scope of the present invention.

It is the design of the present invention that the hydrated cement articles have a high density and strength. It has been observed that the processing parameters can be controlled so that there is little or no measurable swelling or shrinking during hydration of the cement articles prepared according to the principles of the present invention. Hence, a whole new field of cement articles may now be prepared by the processing techniques of the present invention.

It is, therefore, an object of the present invention to provide novel compositions and methods of hydrating hydraulic cement in which the cement can be readily manipulated, shaped, and formed into a strong dense material.

Another important object of the present invention is to provide novel compositions and methods of hydrating hydraulic cement in which the cement can be readily manipulated, shaped, and formed without first mechanically mixing the cement with water to form a cement paste and without the problems associated with manipulating cement paste.

Yet another important object of the present invention is to provide novel hydraulic cement compositions which may be formed into a mechanically self-supporting, predetermined configuration several days before actually hydrating the cement composition.

Still another important advantage of the present invention is to provide novel cement compositions and methods for forming mechanically self-supporting cement composition articles which are sufficiently strong to be subsequently hydrated in a plurality of ways.

Also, another important aspect of the present invention is to provide novel methods for substantially removing air from powdered hydraulic cement while or before the cement is positioned under pressure into a mechanically self-supporting desired configuration.

It is also an object of the present invention to provide novel methods for selecting the size and proportions of cement and aggregate particles which minimize air voids within the cement matrix.

An additional object of the present invention is to provide novel hydraulic cement composite compositions and methods which do not subject the aggregates, fibers, fillers, and powders to hostile or destructive forces.

A further important object of the present invention is to provide novel hydraulic cement composite compositions and methods in which the cement matrix and the aggregates, fibers, fillers, and powders are deliberately positioned in a near net final configuration before hydrating the cement.

These and other objects and features of the present invention will become more fully apparent from the following description and appended claims, or may be learned by the practice of the invention.

DETAILED DESCRIPTION OF THE PREFERRED EMBODIMENTS

The present invention provides novel hydraulically bonded cement compositions and methods for their preparation and use in which powdered hydraulic cement is manipulated and positioned under pressure such that air is substantially removed from the powdered hydraulic cement while the cement is positioned into a mechanically self-supporting near net final position before the cement is hydrated with water. Importantly, the cement compositions within the scope of the present invention are hydrated without mechanical mixing of the cement and water.

Initially, the compositions and methods of the present invention involve the use of the family of cements known as hydraulic cements. Hydraulic cement is characterized by the hydration products that form upon reaction with water. It is to be distinguished from other cements such as polymeric organic cements. The term "powdered hydraulic cement", as used herein, includes clinker, crushed, ground, and milled clinker in various stages of pulverizing and in various particle sizes.

Examples of typical hydraulic cements known in the art include: the broad family of portland cements (including ordinary portland cement without gypsum), calcium aluminate cements (including calcium aluminate cements without set regulators, e,g., gypsum), plasters, silicate cements (including $\beta$ dicalcium silicates, tricalcium silicates, and mixtures thereof), gypsum cements, phosphate cements, and magnesium oxychloride cements. The term hydraulic cement also includes other cements, such as $\alpha$ dicalcium silicate, which can be made hydraulic under hydrating conditions within the scope of the present invention.

Hydraulic cements generally have particle sizes ranging from 0.1 $\mu$m to 100 $\mu$m. The cement particles may be gap graded and recombined to form binary, trinary, or other polynary systems to improve particle packing efficiency. For example, a trinary system having a size ratio of 1:5:25 and a mass ratio of 21.6:9.2:69.2 (meaning that 21.6% of the particles, by weight, are of size 1 unit and 9.2% of the particles, by weight, are of size 5 units and 69.2% of the particles, by weight are of size 25 units) will result in 85% of the space filled with particles after packing.

Another trinary system having a size ratio of 1:7:49 and a mass ratio of 13.2:12.7:66.1 will result in 88% of the space filled with particles after packing. In yet another trinary system having the same size ratio of 1:7:49 but a different mass ratio of 11:14:75 will result in 95% of the space filled with particles after packing. It will be appreciated that other particle size distributions may be utilized to obtain desired packing densities.

A binary system having a size ratio of 0.2:1 and a mass ratio of 30:70 (meaning that 30% of the particles, by weight, are of size 0.2 units and 70% of the particles, by weight, are of size 1 unit) will result in 72% of the space filled with particles after packing. Another binary system having a size ratio of 0.15:1 and a mass ratio of 30:70 will result in 77% of the space filled with particles after packing.

The previous size ratio distributions are merely examples on how to obtain desired particle packing efficiencies. Particle packing is simply the process of selecting the appropriate sizes and proportions of particulate materials to fill larger voids with smaller voids that are again filled with smaller particles, and so on to achieve the desired particle density. Studies have shown that high particle packing efficiency of cement particles prior to hydration results in increased strength and durability of the cured cement article. Increased density of the cement particles decreases the amount of air voids within the cement matrix which weaken the cement article.

The difficulty with particle packing is determining with speed, accuracy, and consistency what size and proportion of available cement particles will result in the desired density. A detailed discussion of how to determine particle packing can be found in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the thesis of Andersen, P. J. "Control and Monitoring of Concrete Production—A study of Particle Packing and Rheology," The Danish Academy of Technical Sciences (1990). For purposes of teaching particle packing techniques, the disclosures of the foregoing article and thesis are incorporated herein by specific reference. One skilled in the art can adopt and apply these teachings.

In general, the cement compositions within the scope of the present invention are prepared by deliberately positioning under pressure a powdered hydraulic cement such that air within the cement is substantially removed while the cement is formed into a mechanically self-supporting near net final position followed by hydration of the positioned article.

The term "near net final position" is intended to include a configuration corresponding substantially to the desired configuration of the final cement article. Thus, once the desired configuration of the final cement article is determined, the powdered hydraulic cement is positioned into a configuration corresponding substantially to that final configuration, after taking into consideration the possibility that there may be some slight swelling or shrinking during cement hydration, depending upon the reaction parameters selected.

The positioning of powdered hydraulic cement within the scope of the present invention is not to be confused with prior art processes which mold and shape cement pastes. As used herein, the term "cement paste" includes cement mixed with water such that the hydration reaction has commenced in the cement paste. Some of the solids processing techniques within the scope of the present invention involve molding and shaping a plastic composition of powdered hydraulic cement. However, such plastic solutions are prepared with nonaqueous solvents, binders, and/or lubricants which do not initiate the hydration reaction.

Solids Processing Techniques

There are a number of different processing techniques capable of deliberately positioning under pressure the powdered hydraulic cement particles into a mechanically self-supporting structure prior to hydration. The term "mechanically self-supporting structure" is intended to include an article which is capable of being ejected from its mold after being pressed into its final shape and maintaining its shape for extended periods of time under gravitational forces absent any external support such as a mold. The article is also capable of being moved and hydrated, under processes such as immersion in an aqueous solution and exposure to water vapor, and still maintain its shape without external support. These techniques involve packing the hydraulic cement and aggregate mixtures to a density greater than the cement's and aggregates natural densities. As used herein, the term "natural density" is defined as the density of powder placed in a container without packing. The air fraction of cement powder at its natural density is usually about 50% or less.

The powdered cement processing techniques are preferably selected to produce hydraulic cement articles that have properties performance tailored to a specific end use. An important part of the present invention is the recognition that many conventional powder processing techniques may be modified and adapted to manipulate under pressure powdered hydraulic cement into a self-supporting structure prior to its hydration. The cement processing techniques suitable for use within the scope of the present invention may be grouped into general categories which include pressure compaction processes and vibratory packing processes.

Other cement powder processing techniques may also be adapted by those skilled in the art for use in practicing the present invention. For instance, high temperature forming processes, such as warm pressing, may be adapted for use in the present invention. Warm pressing involves pressing the powdered cement at temperatures other than ambient temperature. The technique may be used at temperatures up to about 200° C. Higher temperatures may be used as long as possible degradation of the powdered cement is considered. In some cases, cold temperatures, including cryogenic temperatures may be used when pressing with ice or frozen carbon dioxide. High energy rate forming processes which include explosive and pneumatic-mechanical impaction may also be adapted by those skilled in the art for use in the present invention.

a. Pressure Compaction Processes

Pressure compaction processes such as dry pressing and isostatic pressing may be used to position under high pressure the powdered hydraulic cement into a mechanically self-supporting desired predetermined configuration prior to hydration. Dry pressing consists of compacting powders between die faces in an enclosed cavity. The pressure must be sufficient such that the positioned article has sufficient strength to be mechanically self-supporting. Pressures can range from about 10,000 psi to greater than 200,000 psi in normal practice.

Such pressures generally result in materials having void fractions between 1% and 50%, with a preferred void fraction between about 3% and 30%, and a most preferred void fraction in the range from about 5% to about 20%.

Dry pressing is generally used for high production rates of small parts, but can be used for any size part for which equipment is available. Complex shapes are often pressed, but simple flat shapes having substantially parallel faces have the best geometry for pressing. Shapes having varying cross-section thicknesses present problems of obtaining uniform compaction due to nonuniform pressure transfer through the cross section.

Once the article is pressed into its desired shape, it is preferably self-supporting and can be removed from the die for hydration. In some cases additives are mixed with the powdered hydraulic cement to make molding easier and to provide sufficient strength so that the article does not crumble upon removal from the press.

Suitable additives preferably neither initiate hydration nor inhibit hydration of the hydraulic cement. Grading the cement particles, as discussed above, may also provide a certain fluidity of the cement powder during compressing. In addition, it may be useful to lubricate the cement powder with the use of lubricants such as an oil emulsion, according to techniques known in the art, to facilitate the lateral movement among the particles. Suitable emulsions may be prepared using nonaqueous, volatile solvents, such as acetone, methanol, and isopropyl alcohol. Waxes, polyethylene, glycol, or other lubricants may be incorporated into the powder before pressing.

Because cement particles are formed by crushing and grinding larger cement clinker pieces, the individual particles have rough edges. It has also been found that rounding the edges of the cement particles enhances their ability to slide over each other, thereby improving the packing efficiency of the cement particles.

Isostatic pressing is another powder pressing technique in which pressure is exerted uniformly on all surfaces of the cement article. The method is particularly suitable in forming of symmetric shapes, and is similarly employed in the shaping of large articles which could not be pressed by other methods. In principle, the powdered mix is encased in a pliable rubber or polymer mold. Hollow shapes may be prepared by placing a mandrel in the mold and pouring the powdered hydraulic cement between the mandrel and the walls of the pliable mold. Vibration is often used to help pack the mix into the mold cavity.

The mold is then preferably sealed, evacuated to a pressure between 0.1 atm and 0.01 atm, placed in a high-pressure vessel, and gradually pressed to the desired pressure. An essentially noncompressible fluid such as high-pressure oil or water is preferably used. Pressures may range from 1000 psi to 200,000 psi. The forming pressure is preferably gradually reduced before the self-supporting part is removed from the mold for hydration.

b. Vibratory Packing Processes

Vibrational packing processes may also be used to position the powdered hydraulic cement into the desired predetermined configuration prior to hydration. In this important process, the powdered hydraulic cement particles are typically compacted by low-amplitude vibrations. Particle inertia is overcome by application of vibrational energy, causing the particles to pack to a density consistent with the geometric and material characteristics of the system and with the conditions of vibration imposed. Vibration packing is considered a "pressure" process, within the scope of the present invention (and the appended claims), because it is the pressure of each particle acting upon the others which aids in obtaining the required density and formation.

Packed densities as high as 60% of theoretical are possible using vibration packing processes. As used herein, the term "theoretical packing density" is defined as the highest conceivable packing density achievable with a given powder size distribution. Hence, the theoretical packing density is a function of the particle size distribution.

Typical vibration frequencies may range from 1 Hz to 20,000 Hz, with frequencies from about 100 Hz to about 1000 Hz being preferred and frequencies from about 200 Hz to about 300 Hz being most preferred. Typical amplitudes may range from about one half the diameter of the largest cement particle to be packed to about 3 mm, with amplitudes in the range from about one half the diameter of the largest cement particle to about 1 mm. If the amplitude is too large, sufficient packing will not occur.

Once the amplitude is determined, the frequency may be varied as necessary to control the speed and rate of packing. Generally, when the amplitude is higher, the frequency is low and vice-versa. For particle sizes in the range from 0.1 $\mu$m to 50 $\mu$m, the vibration amplitude is preferably in the range from about 10 $\mu$m to about 500 $\mu$m. Although it is not necessary to have a specific particle size distribution in order to successfully use vibrational compaction processes, carefully grading the particle size distribution may improve compaction.

The vibrating packing process described above can result in positioning powdered hydraulic cement into a mechanically self-supporting article which can (if desired) be removed from its mold for subsequent hydration. Most often, however, the vibrating packing process is used in combination with the pressure compaction processes. Vibrating the cement before pressing it allows one to more rapidly obtain the desired packing densities and even obtain higher packing densities.

Air Removal Techniques

To increase the strength and density of resulting hydrated cement articles, air entrained within the loose powder hydraulic cement should be removed from the matrix during or prior to the dry pressure formation of the cement article. As the powdered hydraulic cement is positioned into its desired shape, air within the pores and between the particles of cement is trapped within the formation. The finer the mix and the higher the pressure rate, the more difficult it is for the air to escape. As a result, air becomes compressed within the matrix of the cement article.

Upon release of the pressure from the forming process, the air again expands resulting in increased voids and cracks in the positioned article. The voids and cracks, even though almost imperceptible, will substantially weaken the resulting product. Furthermore, it is often the case that the air will actually disrupt the mechanical stability of the cement article resulting in a "pile of dirt."

Hence, it will be appreciated that an important aspect of the present invention is to remove the air from the powdered hydraulic cement before positioning. There are several methods which can be used to substantially remove the air. One such method is to perform the positioning techniques in a vacuum chamber where all air is removed from the powdered hydraulic cement and the surrounding environment either before or during the positioning.

Another method is to use porous dies so that as the powdered hydraulic cement is being pressed by the dies, air is permitted to escape through pores in the dies. Accordingly, the air is not compressed.

Particle packing, as previously discussed, is also a means for removing air from the powdered hydraulic cement before positioning. The greater the particle packing efficiency, the higher the density of the cement matrix and, accordingly, the less air to be trapped. This method, however, is generally used in combination with the other methods.

Of course, other techniques known in the art which have the same result of removing air such that it is not compressed in the positioned cement article could be used to solve this problem.

Aggregates and Composite Materials

It is within the scope of the present invention to include aggregates commonly used in the cement industry with the powdered hydraulic cement prior to hydration. Examples of such aggregates include sand, gravel, pumice, perlite, and vermiculite. One skilled in the art would know which aggregates to use to achieve desired characteristics in the final cement article.

For many uses it is preferable to include a plurality of differently sized aggregates capable of filling interstices between the aggregates and the powdered hydraulic cement so that greater density can be achieved. The theory of particle packing, as previously discussed, is used to ascertain the proper size and proportion of aggregate to be added to the cement in order to obtain the desired density. In such cases, the differently sized aggregates have particle sizes in the range from about 0.01 $\mu$m to about 2 cm. The chosen particle size is limited by the desired use of the final cement article, but in any event, the cement article should have a thickness at least 4 times the diameter of the largest aggregate particles.

In addition to conventional aggregates used in the cement industry, a wide variety of other aggregates, including unique fillers, fibers, strengtheners, including metals and metal alloys such as stainless steel, iron, copper, silver, and gold, balls, filings, pellets, powders, and fibers such as graphite, silica, alumina, fiberglass, polymeric fibers, and such other fibers typically used to prepare composites, may be combined with the powdered hydraulic cement prior to hydration.

An important advantage of positioning the powdered hydraulic cement into a desired configuration prior to hydration is that many useful aggregates may be placed within the cement article without subjecting the aggregates to hostile and damaging mixing forces usually associated with forming a cement paste.

Accordingly, aggregates which would agglomerate, break, or otherwise be rendered ineffective during mixing or other shear processing can be used with the present invention even though they might not be suitable for use in conventional cement processing techniques. In fact, it is possible to prepare custom designed composite materials having a cement matrix using the principles within the scope of the present invention.

For example, thermally and electrically conducting aggregates, such as metal fibers, wires, powders, spheres (solid or having a conductive coating), and electrically conducting polymers, may be mixed with the powdered hydraulic cement or even deliberately positioned within the powdered hydraulic cement prior to hydration. Such electrically conducting aggregates may be used to conduct electricity through the cement article or dissipate electric charge from the cement article.

Electrical conductors can also provide a radio frequency shield which would insulate and protect sensitive electronic equipment from electrical interference and static. It has been found that aggregates such as stainless steel and iron filings may be positioned and laminated, within custom designed cement articles to provide magnetic, radio frequency shielding, and electrical conducting properties.

Cement Hydration Techniques a. Cement Hydration in General

The term "hydration" as used herein is intended to describe the chemical reactions that take place between the cement and water. The chemistry of hydration is extremely complex and can only be approximated by studying the hydration of pure cement compounds. For simplicity in describing cement hydration, it is often assumed that the hydration of each compound takes place independently of the others that are present in the cement mixture. In reality, cement hydration involves complex interrelated reactions of the each compound in the cement mixture.

With respect to portland cement, the principal cement components are dicalcium silicate and tricalcium silicate. Portland cement generally contains smaller amounts of tricalcium aluminate ($3CaO.Al_2O_3$) and tetracalcium aluminum ferrite ($4CaO.Al_2O_3.FeO$). The hydration reactions of the principal components of portland cement are abbreviated as follows:

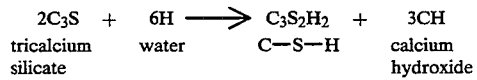
tricalcium water C—S—H calcium
silicate hydroxide

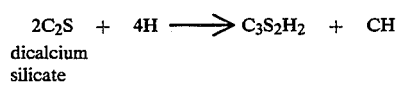
dicalcium
silicate

-continued

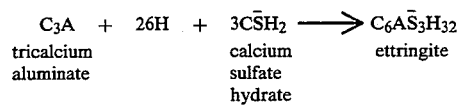
tricalcium calcium ettringite
aluminate sulfate
hydrate

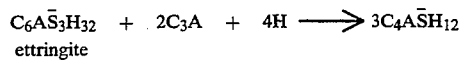
ettringite

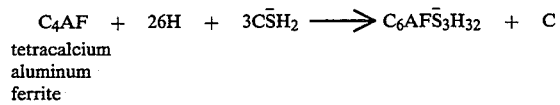
tetracalcium
aluminum
ferrite

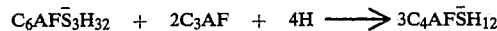

where dicalcium silicate is $2CaO.SiO_2$, tricalcium silicate is $3CaO.SiO_2$, calcium hydroxide is $Ca(OH)_2$, water is $H_2O$, $\bar{S}$ is sulfate, and C-S-H ("calcium silicate hydrate") is the principal hydration product. (The formula $C_3S_2H_2$ for calcium silicate hydrate is only approximate because the composition of this hydrate is actually variable over a wide range ($0.9 < C:S < 3.0$)). It is a poorly crystalline material which forms extremely small particles in the size of colloidal matter less than 0.1 $\mu m$ in any dimension. It will be appreciated that there are many other possible hydration reactions that occur with respect to other hydraulic cements and even with respect to portland cement.

On first contact with water, C and S dissolve from the surface of each $C_3S$ grain, and the concentration of calcium and hydroxide ions rapidly increases. The pH rises to over 12 in a few minutes. The rate of this hydrolysis slows down quickly but continues throughout a dormant period. After several hours under normal conditions, the hydration products, CH and C-S-H, start to form, and the reaction again proceeds rapidly. Dicalcium silicate hydrates in a similar manner, but is much slower because it is a less reactive compound than $C_3S$. For additional information about the hydration reactions, reference is made to F. M. Lee, *Chemistry of Cement and Concrete*, 3rd edition, pp. 177–310.

It has been observed that the better the contact between individual cement particles both before and during hydration, the better the hydration product and the better the strength of the bond between the particles. Hence, the positioning of cement particles in close proximity one to another before and during hydration plays an important role in the strength and quality of the final cement article.

b. Hydration With Gaseous and Liquid Water

It is within the scope of the present invention to hydrate the powdered hydraulic cement after the cement particles have been deliberately positioned into a predetermined configuration. Hydration is accomplished without mechanical mixing of the cement and water. Diffusion of water (both gaseous and liquid) into the preconfigured cement article is an important hydration technique within the scope of the present invention. Immersion of the cement article in water long enough for hydration is also an important hydration technique.

When hydration is achieved by contacting the cement article with gaseous water, the gas may be at atmospheric pressure; however, diffusion of the water into the article, and subsequent hydration, may be increased if the gaseous water is under pressure. The pressure may range from 0.001 torr to about 2000 torr, with pressures from about 0.1 torr to 1000 torr being preferred, and pressures from about 1 torr to about 50 torr being most preferred. Even though water vapor is introduced into the cement compact, it is possible that the water vapor may immediately condense into liquid water within the pores of the cement compact. If this happens, then gaseous water and liquid water may be functional equivalents.

Atomized liquid water may, in some cases, be used in place of gaseous water vapor. As used herein, atomized water is characterized by very small water droplets, whereas gaseous water is characterized by individual water molecules. Gaseous water is currently preferred over atomized water under most conditions because it can permeate the pore structure of the cement article better than atomized water.

The temperature during hydration can affect the physical properties of the hydrated cement article. Therefore, it is important to be able to control and monitor the temperature during hydration. Cooling the cement article during hydration may be desirable to control the reaction rate.

The gaseous water may also be combined with a carrier gas. The carrier gas may be reactive, such as carbon dioxide or carbon monoxide, or the carrier gas may be inert, such as argon, helium, or nitrogen. Reactive carrier gases are useful in controlling the morphology and chemical composition of the final cement article. Reactive carrier gases may be used to treat the hydraulic cement article before, during, and after hydration.

The partial pressure of the water vapor in the carrier gas may vary from about 0,001 torr to about 2000 torr, with 0.1 torr to about 1000 torr being preferred, and 1 torr to about 50 torr being most preferred. An autoclave may be conveniently used to control the gaseous environment during hydration. It is also possible to initially expose the cement article to water vapor for a period of time and then complete the hydration with liquid water. In addition, the cement article may be initially exposed to water vapor and then to carbon dioxide.

Heating the gaseous water will increase the rate of hydration. Temperatures may range from about 25° C. to about 200° C. It should be noted that the temperature at which hydration occurs affects certain physical characteristics of the final cement article, especially if an additional silica source is added. For example, when hydration temperature is greater than 50° C., the formation of a hydrogarnet crystalline phase is observed, and when the hydration temperature is greater than 85° C. other crystalline phases are observed. These crystalline phases, which often weaken the cement structure, are not always desirable. However, in some cases, the pure crystalline phases may be desired. In order to form the pure crystalline phase, it is important to use pure starting materials and to accurately control the hydration temperature.

c. The Effect of Carbon Dioxide on Hydration

The inventors have found that when carbon dioxide is introduced during the stages of hydration, significant structural benefits can be realized, such as high strength and reduced shrinkage on drying. These concepts are disclosed in U.S. Pat. No. 5,23,496 to Jennings et al., entitled PROCESS FOR PRODUCING IMPROVED BUILDING MATERIAL AND PRODUCT THEREOF, which is incorporated herein by specific reference.

More specifically, as applied to the hydraulically bonded cement compositions and methods within the scope of the present invention, it has been found that $CO_2$ can be used to prepare cement articles having improved water resistance, surface toughness, and dimensional stability. These results may be obtained by exposing the cement article to a $CO_2$ atmosphere while rapidly desiccating the cement article. For best results, the $CO_2$ is preferably at a pressure greater than one atmosphere. However, $CO_2$ pressures less than one atmosphere are also useful.

Under the foregoing conditions, it is believed that the $CO_2$ dissolves and reacts with $Ca^{2+}$ to form $CaCO_3$ as the outer surface of the hydrating cement is dried. It is further believed that because the $CaCO_3$ molecular structure is smaller than the C-S-H molecular structure, the outer surface of the cement article shrinks. By rapidly evaporating the water in a $CO_2$ environment, the outer surface of the cement article quickly shrinks relative to the interior of the cement article. By slowly increasing the penetration of $CO_2$ into the interior of the article, the interior is caused to shrink after the exterior has already shrunk. This puts the outer surface in compression relative to interior of the cement article. As a result, cement articles treated with $CO_2$ have greater tensile and compressive strengths and abrasion resistance. With the exterior surface "pre-shrunk," there is improved dimensional stability in environments of changing humidity.

In addition, the $CaCO_3$ seals the exterior surface of the cement article so that it is no longer porous to water, even salt water. It has been observed that as water evaporates, the cement article loses strength because of dimensional changes due to loss of water. The $CaCO_3$ layer formed on the exterior surface prevents water in the interior of the cement article from evaporating so that the cement article stays very strong.

The inventors have also found that if $CO_2$ is sprayed on the surface of a positioned cement article during the first couple of hours of hydration the green body strength increases and the cement sets faster. The "green body strength" is simply the strength of the cement article following its initial hydration but before curing.

d. Control of the Aqueous Solution

Aqueous solutions may also be used to hydrate preconfigured cement articles. As used herein, the term aqueous solution refers to water and water solvents having one or more solutes or ions dissolved therein which modify the hydration of hydraulic cement in a manner different than pure deionized water. For instance, it is possible to simply immerse the unhydrated cement article in lime water to achieve adequate hydration. Lime water is an aqueous solution containing $Ca^{2+}$ and OH ions formed during the hydration reactions. Because of the presence of hydroxide ions, lime water typically has a pH in the range from about 9 to about 11.8. With the presence of $Na^+$ and $K^{2+}$, the pH of the solution can be increased from 11.8 to 13.5.

Other aqueous solutions, such as extracts from cement paste, silica gel, or synthetic solutions may be used to hydrate the preconfigured cement articles. Other ions in addition to $Ca^{2+}$ and OH, such as carbonates, silica, sulfates, sodium, potassium, iron, and aluminum, may also be included in aqueous phase solutions. In addition, solutes such as sugars, polymers, water reducers, and superplasticizer may be used to prepare aqueous solutions within the scope of the present invention.

It has been found that the chemistry of the aqueous phase influences (1) the relationship of the solid fraction particles to each other, (2) the microstructure of the hardened cement article, and (3) the rate of hydration, the rate of strength gain, the rate of cure, and ultimately, the properties of the hardened cement article.

By controlling the chemistry of the aqueous solution, it is possible to predict the physical properties of the final cement article. Manipulation of the aqueous solution enables one to obtain desired rheological properties, microstructural properties, or fracture mechanical properties. A typical aqueous solution within the scope of the present invention may contain one or more of the following components within the following ranges:

| Component | Concentration (ppm) | Most Preferred Concentration (ppm) |
|---|---|---|
| calcium | 0–3000 | 5–100 |
| silicon | 0–25 | 0.25–5 |
| carbon | 0–5000 | 5–250 |
| iron | 0.001–10 | 0.01–0.2 |
| aluminum | 0.001–10 | 0.01–0.2 |
| sulfur | 0–5000 | 200–2000 |
| sodium | 0–2000 | 400–1500 |
| potassium | 0–4000 | 800–2000 |
| sugars | sdr | sdr |
| polymers | sdr | sdr |
| water reducers | sdr | sdr |
| superplasticizer | sdr | sdr |

Where the term "sdr" refers to the standard dosage rate used in the concrete industry, and where the term "ppm" means the number of component atoms or molecules containing the component compound per million molecules of water. Apparatus capable of monitoring the concentrations of ions in the aqueous solution include pH meters and spectrometers which analyze absorbed and emitted light.

e. Cyclic Exposure to Water and Drying

An important discovery related to the hydration of the powdered cement after the cement particles have been deliberately positioned into a predetermined configuration, is that cyclically exposing the cement article to water followed by drying increases the tensile and compressive strength, the surface durability, and the density while reducing porosity. It is currently preferred to dry the cement article at a temperature greater than room temperature and to expose the cement article to lime water or some other aqueous solution, instead of pure deionized water.

The foregoing cement processing techniques within the scope of the present invention open the door to a wide variety of possible new cement products and applications which heretofore have required noncement-based materials. The ability to custom mold and shape articles having excellent physical properties out of low-cost and environmentally safe hydraulic cement represents a significant advancement in the art.

Examples

Various hydraulic cement compositions and their methods of manufacture within the scope of the present invention will be further clarified by a consideration of the following examples, which are intended to be purely exemplary of the use of the invention and should not be viewed as a limitation on any claimed embodiment.

EXAMPLE 1

In this example a hydraulically bonded cement disk was prepared by compressing dry powdered hydraulic cement within a cylindrical press, followed by hydration of the compressed cement disk. A two inch inside diameter cylindrical press was used having two opposing pistons. The upper piston was removed and the lower piston was raised within the cylinder cavity such that a 10 mm cavity was created. An excess amount of ordinary portland cement was poured into the cylinder cavity. The excess cement was removed with a straight edge in order to uniformly distribute the cement. The ordinary portland cement, manufactured by Southwestern Sunbelt Cement Company, had the following approximate composition: 22% $SiO_2$, 2.72% $Al_2O_3$, 65.7% CaO, and 3% FeO.

The lower piston was lowered and the upper piston was placed within the cylindrical press. The cement was compressed under a 90,000 psi load for about 1 minute and then unloaded over 20 seconds. The final compressed powdered cement disk removed from the press had a thickness of approximately 3 mm. The disk had a green density (after packing but before hydration) of 2.23 g/cm$^3$.

The compressed powder cement disk was then immersed into a beaker of saturated lime water having a pH of about 12 for a period of 24 hours. The saturated lime water was prepared by dissolving CaO in water. The lime water was maintained at a temperature between 22° C. and 25° C. at atmospheric pressure during hydration.

Upon removal from the lime water the cement disk had a smooth surface and a texture like porcelain. The disk could not be broken with bare hands. When measured with a normal ruler, the hydrated disk was found to have the same dimensions as the unhydrated disk. There was no visually noticeable expansion or contraction of the disk. Thus, the unhydrated compressed powdered cement disk was essentially the near net shape of the final product.

To further establish that there was no significant expansion or contraction upon hydration, the flat surface of the disk was examined under a confocal microscope having a depth of focus of about 50 $\mu$m. The entire disk surface was in focus, indicating that the disk was flat within 50 $\mu$m. This further suggests that there was no significant differential swelling of the disk.

A surface hardness test showed an Hrb hardness value of 87. The term "Hrb" refers to Hardness Rockwell scale "b." A 4 mm wide beam was cut out of the center of the disk and loaded in a standard 4 point bend test. The tensile strength was measured at 53 MPa.

After fracturing the disk, its microstructure was examined and had many features typical of a ceramic microstructure. For instance, the microstructure included dense grains and circular pores which are typical of ceramic microstructures.

EXAMPLES 2–9

In these examples hydraulically bonded cement disks were prepared by compressing dry powdered hydraulic cement within a cylindrical press, followed by hydration of the compressed cement disk. Compact disks of 4.5 cm diameter and 0.5 cm thickness were prepared by placing hydraulic cement powder (either grey or white cement) within a precision made steel die and compressing from both ends at high pressures ranging from 5000 to 50,000 psi. The compact disks were carefully removed from the die and placed into either an aqueous solution or lime water for curing. They were later desiccated under vacuum and carbonated by exposure to carbon dioxide.

The "grey" cement was ordinary portland cement, manufactured by Ideal Cement Company or Lonestar Cement Company, having the following approximate composition: 20% $SiO_2$, 5% $Al_2O_3$, and 65% CaO, and 2.5% FeO, by bogue analysis. The "white" cement was Atlas white cement having the following approximate composition: 21% $SiO_2$, 3% $Al_2O_3$, 62% CaO, by bogue analysis.

In some of the disks, silica fume or graphite powder was also added in order to further improve the strength. Silica fume was pre-mixed with the cement and compacted to form the disks which were cured and carbonated as described above. Other disks were prepared by placing glass fibers in the middle of the powder during compaction. The pressure applied was 20,000 psi.

The disks were cured as described above. Before being treated with carbon dioxide, the disks had a dull appearance. After treatment with carbon dioxide, the disks all had a natural glaze appearance.

Surface hardness tests (Hrb test), flexural strength test (4 point bend) were conducted on these compact disks. The surface hardness ranged from 41–70 and the flexural strength ranged form 27 MPa to 70 MPa. The density of all hydrated disks was about 3 $g/cm^3$. Table 1 summarizes the experimental parameters and results of Examples 2–9.

TABLE 1

| Example | cement type | packing pressure (psi) | surface hardness (Hrb) | flexural strength (MPa) | aqueous solution | aggregate |
|---|---|---|---|---|---|---|
| 2 | Ideal | 15,000 | 41 | 27 | $H_2O$ | none |
| 3 | Ideal | 40,000 | 56 | 43 | lime $H_2O$ | none |
| 4 | Ideal | 30,000 | 68 | 61 | 10% AP | graphite |
| 5 | Lonestar | 30,000 | 60 | 41 | 10% AP | silica |
| 6 | White | 25,000 | 53 | 45 | 10% AP | silica |
| 7 | White | 32,000 | 59 | 48 | $H_2O$ | graphite |
| 8 | White | 20,000 | 58 | 65 | lime $H_2O$ | fiberglass |
| 9 | White | 30,000 | 70 | 70 | 10% AP | silica |

The term "10% AP" in Table 1 refers to a 10% aqueous phase solution. A cement paste having a 0.4 water to cement ratio was prepared and mixed for 5 minutes. The aqueous phase was extracted and diluted with water to form the 10% aqueous phase solution.

EXAMPLES 10–14

In these examples hydraulically bonded cement disks were prepared according to the general procedures described in connection with Examples 2–9, except that metal powders or filings were mixed with the cement powders prior to compression. The ratio of cement to metal was approximately 60:40 by weight. The curing and carbonation sequences were the same as in Examples 2–9, except that the disks were also heat treated at 200° C. for two hours and tested for surface hardness. The surface hardness before treatment ranged from 60 to 90 Hrb, while the surface hardness after treatment ranged from 70–95 Hrb. The flexural strengths measured in a 4 point bend test were in the range from 40 MPa to 90 MPa. The disks had a density greater than 4.5 $g/cm^3$. The disks possessed magnetic properties. Table 2 summarizes the experimental parameters and results of Examples 10–14. The term "10% AP" in Table 2 refers to a 10% aqueous phase solution. A cement paste having a 0.4 water to cement ratio was prepared and mixed for 5 minutes. The aqueous phase was extracted and diluted with water to form the 10% aqueous phase solution.

TABLE 2

| Example | cement type | pressure (psi) | surface hardness (Hrb) | metal type | aqueous solution type |
|---|---|---|---|---|---|
| 10 | Lonestar | 5000 | 61 | iron fibers | lime $H_2O$ |
| 11 | Lonestar | 2000 | 86 | iron filings | 10% AP |
| 12 | White | 5000 | 78 | iron fibers | lime $H_2O$ |
| 13 | White | 35000 | 90 | iron fibers | 10% AP |
| 14 | White | 25000 | 89 | iron filings | 10% AP |

EXAMPLE 15

In this example a dual-layered hydraulically bonded cement disk was prepared by using white cement for a base layer and a metal powder/cement mixture for the top layer. The disk was compacted under a 100,000 lb load and cured according to the general procedures described in connection with Examples 10–14. The "white" cement was Atlas white cement, having the following approximate composition: 21% $SiO_2$, 3% $Al_2O_3$, 62% CaO, by bogue analysis. The disk had a density greater than 3.7 $g/cm^3$. The ratio of metal to cement was 30:70. The metal consisted of stainless steel filings.

After hydration, the disk had a hardness of 85 Hrb and flexural strength, as measured in a 4 point bend test, of 68 MPa.

EXAMPLE 16

In this example a lightweight, high porosity cement disk was prepared by compressing ground and graded ice in dry powdered hydraulic cement. The ice acted like a fine sand aggregate used in preparing conventional mortars. The compact disk, having a 4.5 cm diameter and 1.0 cm thickness, was prepared using the die and press described in connection with Examples 2–9. The die (both the mold and the plunger), the cement powder, balance, and the mixing pan were kept in a super-cooled chamber to avoid ice melting. After loading the mixture in the die, the fixture was quickly moved to the press and compacted at 10,000 lbs. The disk was carbonated and cured immediately at 100% relative humidity in an autoclave. The disk was desiccated and further carbonated to improve strength. The flexural strength, as measured in a 4 point bend test, was 15 MPa. The disk had a density of 1.3 $g/cm^3$. Uneven pores were observed in the disk.

EXAMPLE 17

In this example a lightweight, high porosity cement disk was prepared according to the procedure of Example 16, except that ground and graded dry ice was used instead of ice, and the disk was heated in steam at 150° C. during the hydration process. Similar physical properties were observed between the disk of Example 16 and the disk of Example 17, except that the strength gain was much quicker using dry ice particles rather than ice. The flexural strength, as measured in a 4 point bend test, was 18 MPa.

EXAMPLE 18

In this example a lightweight disk of high uniform porosity cement disk was prepared by compressing a 50:50 mixture of dry powdered hydraulic cement and soluble granulated salts. The compact disk, having a 4.5 cm diameter and 1.0 cm thickness, was prepared using the die and press described in connection with Examples 2–9. The cement/salt mixture was placed in the die subjected to a 10,000 pound load. The disk was removed and carbonated for 60 minutes at 100% relative humidity under autoclave conditions. The disk was then placed under running water for 24 hours for complete leaching of the salts. The disk had a density of 1.2 g/cm$^3$. Uniform pores were observed in the disk.

EXAMPLE 19

In this example, a hydraulically bonded cement disk is prepared according to the general procedure described in connection with Examples 10–14, except that graphite fibers are dispersed throughout the powdered cement rather than metal powders or filings. Atlas white cement is used and the ratio of graphite fibers to cement is 5:95 by weight. The disk compressed at a pressure of 28,000 psi. Upon curing, the disk has a flexural strength of 71 MPa.

EXAMPLE 20

In this example, a hydraulically bonded cement rod was prepared by the process of isostatic pressing of ordinary portland cement. A latex rubber tube of approximately 1 cm diameter and 10 cm length was filled with the cement powder, sealed, and placed within a pressing chamber. The tube was compressed at a pressure of 35,000 psi. The cement rod had a green density of 3.05 g/cm$^3$. The rod was hydrated by pouring a 10% aqueous phase on its surface to a saturated surface dry condition. After 24 hours the rod had a flexural strength of 71 MPa.

EXAMPLE 21

In this example, a hydraulically bonded cement article is prepared by positioning powdered hydraulic cement without gypsum into a predetermined configuration, exposing the cement to water, and thereafter exposing the cement article to $CO_2$ while in a desiccating environment. The cement article has a glazed surface after 30 minutes and a flexural strength of 33 MPa.

EXAMPLE 22

In this example a high-strength cement disk is prepared by compacting a mixture of cement and fly ash. The ratio of cement to fly ash is 25:75. The disk is compacted in the die and press described in connection with Examples 2–9 under a load of 90,000 pounds. Upon removal from the die, the disk is cured overnight in an aqueous solution having the following components: 900 ppm calcium, 1.0 ppm silicon, 600 ppm sodium, 1200 ppm potassium, and 1250 ppm sulfur. The disk is subsequently carbonated under autoclaving conditions at 100% relative humidity. When tested in a 4 point bend test, the disk has a tensile strength of 38 MPa.

EXAMPLE 23

In this example a high-strength cement disk is prepared according to the procedure of Example 22, except that the disk is cured overnight in an aqueous solution of 70% fly ash and 30% waste lime water. When tested in a 4 point bend test, the disk has a tensile strength of 26 MPa. The strength gain is slower in Example 23 than in Example 22, but the disk has a finer surface finish.

EXAMPLE 24

In this example a custom designed composite cement disk having high strength and magnetic susceptibility is prepared using a cement-metallic mineral mixture. The cement disk is prepared from a mixture of magnetite and portland cement. The ratio of cement to magnetite is 60:40. The disk is compacted in the die and press described in connection with Examples 2–9 under a load of 80,000 pounds. Upon removal from the die, the disk is cured overnight in an aqueous solution having the following components: 900 ppm calcium, 1.0 ppm silicon, 600 ppm sodium, 1200 ppm potassium, and 1250 ppm sulfur. The disk is subsequently carbonated under autoclaving conditions at 100% relative humidity. When tested in a 4 point bend test, the disk has a tensile strength of 48 MPa. Little or no rusting of the disk is observed. The disk possesses magnetic susceptibility making is useful as a radio frequency shield or a surface for creating a magnetic field.

EXAMPLE 25

In this example a hydraulically bonded cement disk is prepared according to the procedure of Example 1, except that a calcium aluminate cement is used instead of ordinary portland cement. Upon hydration the disk develops a flexural strength of 40 MPa within about 1 hour.

EXAMPLE 26

In this example a hydraulically bonded cement disk is prepared according to the procedure of Example 1, except that pure tricalcium silicate is used instead of ordinary portland cement. Upon hydration the disk develops a flexural strength of 40 MPa after about 24 hours.

SUMMARY

From the foregoing, it will be appreciated that the present invention provides novel compositions and methods of hydrating hydraulic cement in which the cement can be readily manipulated, shaped, and formed into a strong dense material.

The present invention also provides novel compositions and methods of hydrating hydraulic cement in which the cement can be readily manipulated, shaped, and formed without first mechanically mixing the cement with water to form a cement paste and without the problems associated with manipulating cement paste. In addition, the present invention provides novel hydraulic cement compositions which may be formed into a desired predetermined mechanically self-supporting configuration several days before actually hydrating the cement composition.

The present invention further provides novel compositions and methods of substantially removing air from powdered hydraulic cement prior to or in conjunction with positioning the powdered hydraulic cement into a mechanically self-supporting article. Also, the present invention provides compositions and methods for selecting and positioning cement and aggregate particles such that the volume of air voids in the cement matrix is minimized.

It will be further appreciated that the present invention provides novel hydraulic cement composite compositions and methods which do not subject the aggregates, fibers, fillers, and powders to hostile or destructive forces. Also, novel hydraulic cement composites may be prepared in which the cement matrix and the aggregates, fibers, fillers, and powders are deliberately positioned into the desired configuration prior to hydrating the cement, thereby enabling unique composite configurations.

It will also be appreciated that the present invention provides strong, lightweight, and low cost articles prepared from hydraulic cement as suitable substitutes for more costly plastic and ceramic articles.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for preparing a cementitious article from a hydraulic cement composition, the method comprising the steps of:
   (a) applying pressure to a powdered hydraulic cement composition within a mold such that air within the powdered hydraulic cement composition is substantially removed and the powdered hydraulic cement composition is formed into a mechanically self-supporting structure of a near net final position substantially corresponding to a desired article shape;
   (b) removing the mechanically self-supporting structure from the mold; and
   (c) hydrating the mechanically self-supporting structure by contacting the structure with an aqueous solution without substantial mechanical mixing of the cement composition and aqueous solution, thereby forming the cementitious article.

2. A method for preparing a cementitious article from a hydraulic cement composition as defined in claim 1, wherein the aqueous solution is extracted from cement paste.

3. A method for preparing a cementitious article from a hydraulic cement composition as defined in claim 1, wherein the aqueous solution is gaseous water.

4. A method for preparing a cementitious article from a hydraulic cement composition as defined in claim 1, wherein the powdered hydraulic cement composition has an initial density and is deliberately positioned by increasing the initial density of the powdered hydraulic cement composition.

5. A method for preparing a cementitious article from a hydraulic cement composition as defined in claim 1, wherein the powdered hydraulic cement composition is deliberately positioned into the near net final position by compressing the powdered hydraulic cement composition into a confined area substantially corresponding to the desired article shape.

6. A method for preparing a cementitious article from a hydraulic cement composition as defined in claim 1, further comprising the step of mixing an aggregate with the powdered hydraulic cement composition prior to hydrating the cement composition.

7. A method for preparing a cementitious article from a hydraulic cement composition as defined in claim 1, further comprising the step of exposing the powdered hydraulic cement composition to carbon dioxide.

8. A method for preparing a cementitious article from a hydraulically bonded cement composition as defined in claim 1, wherein the powdered hydraulic cement composition is hydrated in a partial vacuum environment.

9. A method for preparing a cementitious article from a hydraulically bonded cement composition as defined in claim 1, wherein the air within the powdered hydraulic cement composition is substantially removed by compressing the powdered hydraulic cement composition in a vacuum environment.

10. A method for preparing a cementitious article from a hydraulically bonded cement composition as defined in claim 1, wherein the air within the powdered hydraulic cement composition is substantially removed by compressing the powdered hydraulic cement composition by means of porous dies.

11. A method for preparing a cementitious article from a hydraulically bonded cement composition as defined in claim 10, wherein the porous dies exert a pressure of at least 10,000 psi during the compressing step.

12. A method for preparing a hydraulically bonded composite article comprising the steps of:
   (a) applying pressure to a powdered hydraulic cement composition within a mold such that air within the powdered hydraulic cement composition is substantially removed and the powdered hydraulic cement composition is positioned into a mechanically self-supporting structure of a predetermined configuration corresponding substantially to a desired configuration of the composite article, the powdered hydraulic cement composition being capable of forming a continuous matrix having powdered hydraulic cement particles and aggregate particles dispersed therein, the powdered hydraulic cement particles and the aggregate particles having a density and a particle size distribution;
   (b) removing the mechanically self-supporting structure from the mold; and
   (c) hydrating the mechanically self-supporting structure by contacting the structure with an aqueous solution without substantial mixing of the cement particles and the aqueous solution, thereby forming the hydraulically bonded composite article.

13. A method for preparing a hydraulically bonded composite article as defined in claim 12, wherein the powdered hydraulic cement composition is deliberately positioned to a density in a range from about 75% to about 100% of the maximum achievable density for the given particle size distribution of the powdered hydraulic cement particles and the aggregate particles.

14. A method for preparing a hydraulically bonded composite article as defined in claim 12, wherein the powdered hydraulic cement composition has a predetermined polynary size distribution.

15. A method for preparing a hydraulically bonded composite article as defined in claim 12, wherein the powdered hydraulic cement composition is deliberately positioned under pressure into the mechanically self-supporting structure of a predetermined configuration corresponding substantially to the desired configuration of the hydraulically bonded composite article by compressing the powdered hydraulic cement composition into the mold.

16. A method for preparing a hydraulically bonded composite article as defined in claim 15, wherein the powdered hydraulic cement composition is compressed into the mold under a pressure in a range from about 1000 psi to about 200,000 psi.

17. A method for preparing a hydraulically bonded composite article as defined in claim 15, wherein the powdered hydraulic cement composition is compressed into the mold using an isostatic press.

18. A method for preparing a hydraulically bonded composite article as defined in claim 12, wherein the powdered hydraulic cement composition is deliberately positioned under pressure into the mechanically self-supporting structure of a predetermined configuration corresponding substantially to the desired configuration of the hydraulically bonded composite article by the process of dry pressing the powdered hydraulic cement composition between die faces.

19. A method for preparing a hydraulically bonded composite article as defined in claim 12, wherein the powdered hydraulic cement composition is deliberately positioned under pressure into the mechanically self-supporting structure of a predetermined configuration corresponding substantially to the desired configuration of the hydraulically bonded composite article by the process of vibrational compaction of the powdered hydraulic cement composition within the mold.

20. A method for preparing a hydraulically bonded composite article as defined in claim 12, wherein the powdered hydraulic cement composition includes a mixture of chemically different hydraulic cements.

21. A method for preparing a hydraulically bonded composite article as defined in claim 12, wherein the powdered hydraulic cement composition includes a portland cement.

22. A method for preparing a hydraulically bonded composite article as defined in claim 12, wherein the powdered hydraulic cement composition includes a calcium aluminate cement.

23. A method for preparing a hydraulically bonded composite article as defined in claim 12, wherein the powdered hydraulic cement composition includes di-calcium silicate.

24. A method for preparing a hydraulically bonded composite article as defined in claim 12, wherein the powdered hydraulic cement composition includes tri-calcium silicate.

25. A method for preparing a hydraulically bonded composite article as defined in claim 12, wherein the powdered hydraulic cement composition includes a phosphate cement.

26. A method for preparing a hydraulically bonded composite article as defined in claim 12, wherein the aqueous solution is gaseous water.

27. A method for preparing a hydraulically bonded composite article as defined in claim 26, wherein the gaseous water has a vapor pressure in a range from about 0.1 torr to about 1000 torr.

28. A method for preparing a hydraulically bonded composite article as defined in claim 26, wherein the gaseous water has a vapor pressure in a range from about 1 torr to about 50 torr.

29. A method for preparing a hydraulically bonded composite article as defined in claim 12, wherein the aqueous solution is atomized liquid water.

30. A method for preparing a hydraulically bonded composite article as defined in claim 12, wherein the hydrating step includes immersing the mechanically self-supporting structure within the aqueous solution.

31. A method for preparing a hydraulically bonded composite article as defined in claim 12, wherein the aqueous solution has a pH in a range from about 7 to about 14.

32. A method for preparing a hydraulically bonded composite article as defined in claim 12, wherein the aqueous solution has a pH in a range from about 9 to about 13.5.

33. A method for preparing a hydraulically bonded composite article as defined in claim 12, wherein the aqueous solution has a pH in a range from about 10 to about 12.5.

34. A method for preparing a hydraulically bonded composite article as defined in claim 12, wherein the aqueous solution includes calcium as a component.

35. A method for preparing a hydraulically bonded composite article as defined in claim 12, wherein the aqueous solution includes carbon as a component.

36. A method for preparing a hydraulically bonded composite article as defined in claim 12, wherein the aqueous solution includes sulfur as a component.

37. A method for preparing a hydraulically bonded composite article as defined in claim 12, wherein the aqueous solution includes sodium as a component.

38. A method for preparing a hydraulically bonded composite article as defined in claim 12, wherein the aqueous solution includes potassium as a component.

39. A method for preparing a hydraulically bonded composite article as defined in claim 12, wherein the aqueous solution includes a sugar as a component.

40. A method for preparing a hydraulically bonded composite article as defined in claim 12, wherein the aqueous solution includes a water reducer as a component.

41. A method for preparing a hydraulically bonded composite article as defined in claim 12, wherein the aqueous solution includes a superplasticizer as a component.

42. A method for preparing a hydraulically bonded composite article as defined in claim 12, wherein the powdered hydraulic cement composition is hydrated in an environment having a relative humidity in a range from about 25% to about 100%.

43. A method for preparing a hydraulically bonded composite article as defined in claim 12, wherein the powdered hydraulic cement composition is hydrated in a controlled gaseous environment including carbon dioxide.

44. A method for preparing a hydraulically bonded composite article as defined in claim 12, wherein the powdered hydraulic cement composition is hydrated in a controlled gaseous environment including carbon monoxide.

45. A method for preparing a hydraulically bonded composite article as defined in claim 12, wherein the powdered hydraulic cement composition is hydrated in a partial vacuum environment.

46. A method for preparing a hydraulically bonded composite article as defined in claim 12, wherein the powdered hydraulic cement composition is hydrated in an environment having a temperature in a range from about $-10°$ C. to about 200° C.

47. A method for preparing a hydraulically bonded composite article as defined in claim 26, wherein the powdered hydraulic cement composition is hydrated with gaseous water having a temperature in a range from about $-10°$ C. to about 200° C.

48. A method for preparing a hydraulically bonded composite article as defined in claim 12, wherein the hydrated powdered hydraulic cement composition has a ratio of water to cement in a range from about 0.01 to about 0.4.

49. A method for preparing a hydraulically bonded composite article as defined in claim 12, wherein the hydrated powdered hydraulic cement composition has a ratio of water to cement in a range from about 0.025 to about 0.3.

50. A method for preparing a hydraulically bonded composite article as defined in claim 12, wherein the hydrated powdered hydraulic cement composition has a ratio of water to cement in a range from about 0.05 to about 0.2.

51. A method for preparing a hydraulically bonded composite article as defined in claim 12, wherein the hydrated powdered hydraulic cement composition has a ratio of water to cement in a range from about 0.1 to about 0.2.

52. A method for preparing a hydraulically bonded composite article as defined in claim 12, wherein the aggregate particles have a predetermined polynary size distribution.

53. A method for preparing a hydraulically bonded composite article as defined in claim 12, wherein the aggregate particles comprise a plurality of differently sized aggregates having particle sizes in a range from about 0.01 $\mu$m to about 3 cm.

54. A method for preparing a hydraulically bonded composite article as defined in claim 12, wherein the aggregate particles comprise a plurality of differently sized aggregates having particle sizes in a range from about 1 $\mu$m to about 1 cm.

55. A method for preparing a hydraulically bonded composite article as defined in claim 12, wherein the aggregate particles comprise a plurality of differently sized aggregates having particle sizes in a range from about 50 $\mu$m to about 100 $\mu$m.

56. A method for preparing a hydraulically bonded composite article as defined in claim 12, wherein the air within the powdered hydraulic cement composition is substantially removed by positioning the powdered hydraulic cement composition in a vacuum environment.

57. A method for preparing a hydraulically bonded composite article as defined in claim 12, wherein the air within the powdered hydraulic cement composition is substantially removed by positioning the powdered hydraulic cement composition by means of porous dies.

58. A method for preparing a hydraulically bonded composite article as defined in claim 12, wherein the powdered hydraulic cement composition comprises a plurality of hydraulic cement particles having a predetermined polynary size distribution.

59. A method for preparing a hydraulically bonded composite article as defined in claim 58, wherein the predetermined polynary size distribution of the hydraulic cement particles is selected to increase particle packing efficiency of the hydraulic cement composition.

60. A method for preparing a hydraulically bonded composite article as defined in claim 52, wherein the hydraulic cement composition has a particle packing efficiency and wherein the predetermined polynary size distribution of the aggregate particles is selected to increase the particle packing efficiency of the hydraulic cement composition.

61. A method for preparing a hydraulically bonded composite article as defined in claim 12, wherein the aggregate particles include a plurality of fibers.

62. A method for preparing a hydraulically bonded composite article as defined in claim 12, wherein the aggregate particles include a plurality of graphite fibers.

63. A method for preparing a hydraulically bonded composite article as defined in claim 12, wherein the aggregate particles include a plurality of glass fibers.

64. A method for preparing a hydraulically bonded composite article as defined in claim 12, wherein the aggregate particles include a plurality of alumina fibers.

65. A method for preparing a hydraulically bonded composite article as defined in claim 12, wherein the aggregate particles include a plurality of silica fibers.

66. A method for preparing a hydraulically bonded composite article as defined in claim 12, wherein the aggregate particles include a plurality of polymeric fibers.

67. A method for preparing a hydraulically bonded composite article as defined in claim 12, wherein the aggregate particles include an electrically conducting aggregate.

68. A method for preparing a hydraulically bonded composite article as defined in claim 67, wherein the electrically conducting aggregate is capable of conducting electricity through the hydraulically bonded composite article.

69. A method for preparing a hydraulically bonded composite article as defined in claim 67, wherein the electrically conducting aggregate includes a plurality of metallic fibers mixed within the powdered hydraulic cement composition.

70. A method for preparing a hydraulically bonded composite article as defined in claim 12, further comprising the steps of:
drying the hydraulically bonded composite article after the hydrating step; and
reexposing the hydraulically bonded composite article to water.

71. A method for preparing a hydraulically bonded composite article as defined in claim 12, further comprising the step of exposing the hydraulically bonded composite article to carbon dioxide in a desiccating environment.

72. A method for preparing a hydraulically bonded composite article as defined in claim 12, further comprising the step of exposing the hydraulically bonded composite article to carbon monoxide in a desiccating environment.

73. A method for preparing a hydraulically bonded article shaped in a predetermined configuration, the method comprising the steps of:
(a) applying pressure to a powdered hydraulic cement composition within a mold such that air within the powdered hydraulic cement composition is substantially removed and the powdered hydraulic cement composition is positioned into a mechanically integral self-supporting structure of a predetermined configuration corresponding substantially to a desired configuration of the hydraulically bonded article;
(b) removing the mechanically integral self-supporting structure from the mold; and
(c) hydrating the mechanically integral self-supporting structure with an aqueous solution having at least one component that modifies the hydration of the powdered hydraulic cement composition, thereby forming the hydraulically bonded article, the hydrating step being performed without substantial mechanical mixing of the powdered hydraulic cement composition and the aqueous solution.

74. A method for preparing a hydraulically bonded article as defined in claim 73, wherein the powdered hydraulic cement composition has an initial density and is deliberately positioned by increasing the initial density of the powdered hydraulic cement composition.

75. A method for preparing a hydraulically bonded article as defined in claim 73, wherein the powdered hydraulic cement composition has a given particle size distribution and a maximum achievable particle packing density and wherein the powdered hydraulic cement composition is deliberately positioned under pressure to a density in a range from about 75% to about 100% of the maximum achievable density for the given particle size distribution of the powdered hydraulic cement composition.

76. A method for preparing a hydraulically bonded article as defined in claim 73, wherein the powdered hydraulic cement composition has a predetermined polynary size distribution.

77. A method for preparing a hydraulically bonded article as defined in claim 73, wherein individual cement particles of the powdered hydraulic cement composition are rounded to improve packing efficiency.

78. A method for preparing a hydraulically bonded article as defined in claim 73, wherein the powdered hydraulic cement composition is deliberately positioned under pressure into the mechanically integral self-supporting structure of the predetermined configuration corresponding substantially to the desired configuration of the hydraulically bonded article by compressing the powdered hydraulic cement composition into the mold.

79. A method for preparing a hydraulically bonded article as defined in claim 78, wherein the powdered hydraulic cement composition is compressed into the mold under a load in a range from about 1,000 psi to about 200,000 psi.

80. A method for preparing a hydraulically bonded article as defined in claim 78, wherein the powdered hydraulic cement composition is compressed into the mold using an isostatic press.

81. A method for preparing a hydraulically bonded article as defined in claim 73, wherein the powdered hydraulic cement composition is deliberately positioned under pressure into the mechanically integral self-supporting structure of the predetermined configuration corresponding substantially to the desired configuration of the hydraulically bonded article by the process of dry pressing the powdered hydraulic cement composition between die faces.

82. A method for preparing a hydraulically bonded article as defined in claim 81, wherein the powdered hydraulic cement composition is deliberately positioned under pressure by the process of dry pressing between die faces under a load in a range from about 10,000 psi to about 200,000 psi.

83. A method for preparing a hydraulically bonded article as defined in claim 73, wherein the powdered hydraulic cement composition is deliberately positioned into the predetermined configuration corresponding substantially to the desired configuration of the hydraulically bonded article by the process of vibrational compaction of the powdered hydraulic cement composition into the mold.

84. A method for preparing a hydraulically bonded article as defined in claim 73, wherein the powdered hydraulic cement composition includes a mixture of chemically different hydraulic cements.

85. A method for preparing a hydraulically bonded article as defined in claim 73, wherein the powdered hydraulic cement composition includes a portland cement.

86. A method for preparing a hydraulically bonded article as defined in claim 73, wherein the powdered hydraulic cement composition includes a calcium aluminate cement.

87. A method for preparing a hydraulically bonded article as defined in claim 73, wherein the powdered hydraulic cement composition includes dicalcium silicate.

88. A method for preparing a hydraulically bonded article as defined in claim 73, wherein the powdered hydraulic cement composition includes tricalcium silicate.

89. A method for preparing a hydraulically bonded article as defined in claim 73, wherein the powdered hydraulic cement composition includes a phosphate cement.

90. A method for preparing a hydraulically bonded article as defined in claim 73, wherein the aqueous solution comprises lime water.

91. A method for preparing a hydraulically bonded article as defined in claim 73, wherein the aqueous solution has a pH in a range from about 7 to about 14.

92. A method for preparing a hydraulically bonded article as defined in claim 73, wherein the aqueous solution has a pH in a range from about 9 to about 13.5.

93. A method for preparing a hydraulically bonded article as defined in claim 73, wherein the aqueous solution has a pH in a range from about 10 to about 12.5.

94. A method for preparing a hydraulically bonded article as defined in claim 73, wherein the aqueous solution includes calcium as a component.

95. A method for preparing a hydraulically bonded article as defined in claim 73, wherein the aqueous solution includes hydroxide ions as a component.

96. A method for preparing a hydraulically bonded article as defined in claim 73, wherein the aqueous solution includes carbon as a component.

97. A method for preparing a hydraulically bonded article as defined in claim 73, wherein the aqueous solution includes sulfur as a component.

98. A method for preparing a hydraulically bonded article as defined in claim 73, wherein the aqueous solution includes sodium as a component.

99. A method for preparing a hydraulically bonded article as defined in claim 73, wherein the aqueous solution includes potassium as a component.

100. A method for preparing a hydraulically bonded article as defined in claim 73, wherein the aqueous solution includes a sugar as a component.

101. A method for preparing a hydraulically bonded article as defined in claim 73, wherein the aqueous solution includes a water reducer as a component.

102. A method for preparing a hydraulically bonded article as defined in claim 73, wherein the aqueous solution includes a superplasticizer as a component.

103. A method for preparing a hydraulically bonded article as defined in claim 73, wherein the powdered hydraulic cement composition is hydrated in an environment having a temperature in a range from about $-10°$ C. to about 200° C.

104. A method for preparing a hydraulically bonded article as defined in claim 73, wherein the hydrated powdered hydraulic cement composition has a ratio of water to cement in a range from about 0.01 to about 0.4.

105. A method for preparing a hydraulically bonded article as defined in claim 73, wherein the hydrated powdered hydraulic cement composition has a ratio of water to cement in a range from about 0.025 to about 0.3.

106. A method for preparing a hydraulically bonded article as defined in claim 73, wherein the hydrated powdered hydraulic cement composition has a ratio of water to cement in a range from about 0.05 to about 0.2.

107. A method for preparing a hydraulically bonded article as defined in claim 73, wherein the hydrated powdered hydraulic cement composition has a ratio of water to cement in a range from about 0.1 to about 0.2.

108. A method for preparing a hydraulically bonded article as defined in claim 73, further comprising the step of mixing at least one aggregate within the powdered hydraulic cement composition.

109. A method for preparing a hydraulically bonded article as defined in claim 73, further comprising the step of mixing a plurality of differently sized aggregate particles having a predetermined polynary size distribution within the powdered hydraulic cement composition.

110. A method for preparing a hydraulically bonded article as defined in claim 73, wherein the air within the powdered hydraulic cement composition is removed by positioning the powdered hydraulic cement composition in a vacuum environment.

111. A method for preparing a hydraulically bonded article as defined in claim 73, wherein the air within the powdered hydraulic cement composition is substantially removed by positioning the powdered hydraulic cement composition by means of porous dies.

112. A method for preparing a hydraulically bonded article as defined in claim 109, wherein the aggregate particles have a particle packing efficiency and wherein the plurality of differently sized aggregate particles are selected to increase the particle packing efficiency of the aggregate particles.

113. A method for preparing a hydraulically bonded article as defined in claim 73, further comprising the step of mixing an electrically conducting aggregate with the powdered hydraulic cement composition.

114. A method for preparing a hydraulically bonded article as defined in claim 73, further comprising the step of mixing a plurality of fibers with the powdered hydraulic cement composition.

115. A method for preparing a hydraulically bonded article as defined in claim 73, further comprising a powdered aggregate mixed with the powdered hydraulic cement composition.

116. A method for preparing a hydraulically bonded article as defined in claim 73, further comprising the steps of:
drying the hydraulically bonded article after the hydrating step; and
reexposing the hydraulically bonded article with water.

117. A method for preparing a hydraulically bonded article as defined in claim 73, further comprising the step of exposing the powdered hydraulic cement composition to carbon dioxide in a desiccating environment.

118. A method for preparing a hydraulically bonded article as defined in claim 73, further comprising the step of exposing the powdered hydraulic cement composition to carbon monoxide in a desiccating environment.

119. A method for preparing a hydraulically bonded article shaped in a predetermined configuration, the method comprising the steps of:
(a) applying pressure to a powdered hydraulic cement composition having a predetermined polynary size distribution within a mold such that air within the powdered hydraulic cement composition is substantially removed and the powdered hydraulic cement composition is positioned into a mechanically self-supporting structure of a predetermined configuration corresponding substantially to a desired configuration of the hydraulically bonded article;
(b) removing the mechanically self-supporting structure from the mold; and
(c) hydrating the mechanically self-supporting structure with an aqueous solution without substantial mechanical mixing of the powdered hydraulic cement composition and water, thereby forming the hydraulically bonded article.

120. A method for preparing a hydraulically bonded article as defined in claim 119, wherein the powdered hydraulic cement composition is deliberately positioned under pressure into the mechanically self-supporting structure of a predetermined configuration corresponding substantially to the desired configuration of the hydraulically bonded article by compressing the powdered hydraulic cement composition into the mold.

121. A method for preparing a hydraulically bonded article as defined in claim 119, wherein the powdered hydraulic cement composition is hydrated by contacting the powdered hydraulic cement composition with the aqueous solution.

122. A method for preparing a hydraulically bonded article as defined in claim 119, wherein the powdered hydraulic cement composition is hydrated in a controlled gaseous environment including carbon dioxide.

123. A method for preparing a hydraulically bonded article as defined in claim 119, wherein an aggregate is dispersed within with the powdered hydraulic cement composition prior to hydrating the hydraulic cement composition.

124. A method for preparing a hydraulically bonded article from a hydraulic cement composition shaped in a predetermined configuration, the method comprising the steps of:
(a) applying pressure to and controlling the density of a powdered hydraulic cement composition within a vessel such that air within the powdered hydraulic cement composition is substantially removed, thereby forming the hydraulic cement composition into a mechanically self-supporting structure having a predetermined configuration corresponding substantially to a desired configuration of the hydraulically bonded article;
(b) removing the mechanically self-supporting structure from the vessel;
(c) exposing the powdered hydraulic cement composition to water so as to hydrate the cement composition without substantial mechanical mixing of the cement composition and the water; and
(d) allowing the hydrating cement composition to cure into the hydraulically bonded article.

125. A method for preparing a hydraulically bonded article as defined in claim 124, wherein the hydrated cement composition is cured without significant change in the configuration of the hydraulic cement composition.

* * * * *

UNITED STATES PATENT AND TRADEMARK OFFICE
CERTIFICATE OF CORRECTION

PATENT NO. : 5,358,676
DATED : October 25, 1994
INVENTOR(S) : Hamlin M. Jennings et al.

It is certified that error appears in the above-indentified patent and that said Letters Patent is hereby corrected as shown below:

At Col. 13, line 33, before "torr" change "0,001" to --0.001--.
    at line 63, after "No." change "5,23,496" to --5,232,496--.

At Col. 17, line 25, after "ranged" change "form" to --from--.

At Col. 30, line 39, after "within" delete "with".

Signed and Sealed this

Twenty-third Day of May, 1995

Attest:

BRUCE LEHMAN

*Attesting Officer*    *Commissioner of Patents and Trademarks*